United States Patent [19]

Kwok

[11] 3,944,979
[45] Mar. 16, 1976

[54] METHOD AND APPARATUS FOR ILLUMINATING AN OBJECT BEARING INDICIA

[75] Inventor: Kenneth Kwok, Inglewood, Calif.

[73] Assignee: Data Source Corporation, Wilmington, Del.

[22] Filed: Dec. 23, 1974

[21] Appl. No.: 535,767

[52] U.S. Cl........ 340/146.3 AG; 250/205; 250/567
[51] Int. Cl.² .......................................... G06K 7/14
[58] Field of Search ........... 250/205, 568, 569, 567; 340/146.3 AG

[56] References Cited
UNITED STATES PATENTS

| | | | |
|---|---|---|---|
| 3,631,250 | 12/1971 | Van Buskirk | 250/205 |
| 3,783,273 | 1/1974 | Strohschneider | 250/568 |
| 3,796,866 | 3/1974 | McClellan | 250/205 |
| 3,835,247 | 9/1974 | Soames | 250/205 |

Primary Examiner—Leo H. Boudreau
Attorney, Agent, or Firm—Seidel, Gonda & Goldhammer

[57] ABSTRACT

A light source in an optical character recognition system is automatically controlled to operate at a plurality of light intensities. A relatively high light intensity is used to illuminate an object bearing indicia to be read. A relatively low light intensity is used at all other times. A plurality of detectors sense reflected or ambient light and produce output signals indicative of the intensity of the reflected or ambient light. First and second signals are generated to indicate whether the detector output is greater than or less than a predetermined threshold. The number of first and second signals generated in response to the outputs of the detectors are summed separately. If the number of first signals equals or exceeds a first predetermined number, the object is illuminated at a high light intensity. If the number of first signals is less than the first predetermined number, or if the number of second signals generated equals or exceeds a second predetermined number, the light source is switched to a low level light intensity.

18 Claims, 1 Drawing Figure

U.S. Patent   March 16, 1976   3,944,979
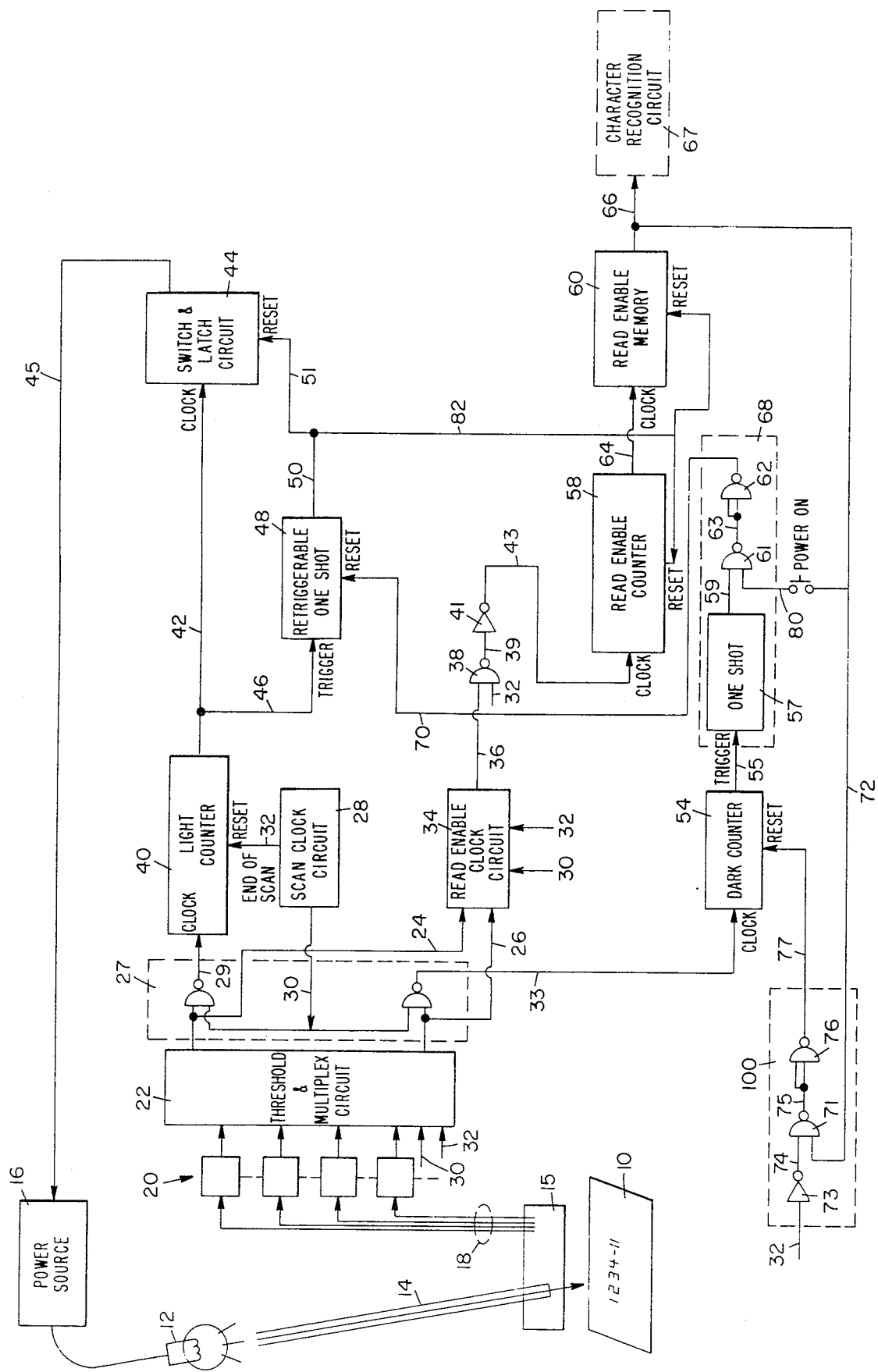

METHOD AND APPARATUS FOR ILLUMINATING AN OBJECT BEARING INDICIA

BACKGROUND OF THE INVENTION

The present invention relates to an optical character recognition system having a controllable light source for illuminating an object such as a credit card, paper tag, container and the like bearing indicia to be read. In particular, the present invention is directed to a method and apparatus for controlling the light source to illuminate an object having indicia to be read at a relatively high light intensity and to maintain said high light intensity during the reading of the indicia on the object, and to reduce the light intensity to a low level after the indicia is read.

It is known in the prior art to automatically operate a light source at a plurality of light intensities in response to light reflected from an object. For example, U.S. Pat. No. 3,631,250, entitled Optical Positive Feedback Sensor Circuit, issued to Van Buskirk, describes an apparatus for this purpose. A single photodetector senses the light reflected by coded information on an object and controls a positive feedback loop which determines the intensity at which the object is illuminated. The positive feedback loop includes a series of cascaded transistors which are operated either in a quiescent state or in saturation. Any light reflected from the coded information on the object is sensed by the detector which causes the positive feedback loop to seek a non-linear condition, such as saturation. In the non-linear condition, the positive feedback loop causes the object to be illuminated at the maximum light intensity. If, however, no light is reflected from the object, the sensor drives the positive feedback loop in the quiescent condition. In the quiescent condition, the positive feedback loop causes the object to be illuminated at the minimum light intensity.

Such a device is suited for use with an object comprising shapeless coded indicia in the form of reflective and non-reflective surfaces. Where, however, the shape of the indicia must be identified, for example, where the indicia are alpha-numeric characters, such a device is inadequate. In that case, it is well known that a plurality of detectors is required to sense specific portions of each character to properly identify the character. Although a single detector may be used to indicate the presence of characters, it cannot be used to distinguish between characters. Furthermore, in reading a plurality of characters it is necessary to control the duration of the high light intensity and maintain this intensity during reading, which the device in U.S. Pat. No. 3,631,250 cannot do.

In a character recognition system, the shape of the indicia is important and the absence of reflected light is an essential piece of information for identifying the indicia. In addition, the absence of reflective light may indicate that the object is not being illuminated at all and only ambient light is being detected. In that case, it is desirable to rapidly recognize this condition and then reduce the light intensity to a low level. A device such as the one described in U.S. Pat. No. 3,631,250 is entirely unsuitable for this purpose. In such a device, should a detector sense reflected or ambient light, the object will be illuminated at the maximum light intensity. Thus, such a device cannot distinguish between true reflections and spurious reflections on strong ambient light, and therefore, cannot adequately control the light intensity for character recognition.

In character recognition systems, the shape of each character must be sensed. For this purpose, character recognition systems employ a plurality of detectors for sensing the non-reflective portions of the character as well as the reflective portions of the object which bear the characters. At the time that characters are to be read, it is desirable to use a relatively high light intensity. However, during all other times, it is desirable to use a relatively low light intensity.

By illuminating the character at a relatively high light intensity only when characters are to be read, the lifetime of the source of illumination can be increased and the deleterious effects of heat dissipation on other components of the system placed in proximity to the source of illumination can be minimized. Furthermore, since the source of illumination may be located in a portable wand which is manually transported past the characters to be identified, continuously operating the source at a relatively high level of intensity may cause the wand to heat up, causing discomfort to the operator and, in the extreme, preventing further manual transportation of the wand. To prevent such discomfort, the source should be operated at the relatively high level of intensity only when characters are to be identified.

Although the source of illumination in a character recognition system may be manually controlled to ameliorate the effects described above, it is well known that manual operation can prove cumbersome and can frequently be attended by operator error. It is therefore desirable to control the light intensity at which characters are illuminated and the duration thereof automatically and without any intervention by an operator.

Moreover, character recognition systems often include rather elaborate and detailed components and, for the sake of economy, it is desirable that any auxiliary control equipment be relatively simple and flexible. In particular, it is desirable that an auxiliary system for automatically controlling the light intensity at which characters are illuminated and the duration of such intensity be simple and flexible, using as much of the subsisting character recognition system as possible.

A primary advantage of the present invention is that it automatically controls the intensity of a light source with which an object bearing indicia is to be illuminated and the duration of such intensity without operator intervention.

A further advantage of the present invention is that it controls the intensity of a light source with which an object is to be illuminated and the duration of such intensity using relatively simple and flexible components to allow for easy adjustment to a variety of operating conditions.

A still further advantage of the present invention is that it controls the intensity of a light source with which an object is to be illuminated without introducing redundant and unnecessary equipment, that is, by using subsisting portions of a character recognition system.

Another advantage of the present invention is that it increases the lifetime of the source of illumination and eliminates the deleterious effects of heat dissipation of components of the system located proximately thereto.

Other advantages of the present invention appear hereinafter.

BRIEF SUMMARY OF THE INVENTION

Briefly, in the present invention, the light source of an optical character recognition system is controlled to operate at a plurality of light intensities. The character recognition system includes a plurality of detectors which sense light reflected from an object or ambient light. Each detector produces an output signal indicative of the intensity of the reflected or ambient light. Generating means generate a first signal when the detector output exceeds a predetermined threshold and a second signal when the detector output is less than the predetermined threshold. A first summing means generates a first sum signal representing the number of first signals generated by the generating means. A second summing means generates a second sum signal representing the number of second signals generated by the generating means. The light source is controlled to be operated at a high light intensity when the first sum signal equals or exceeds a first predetermined number. The light source is controlled to be operated at a low light intensity at all other times.

A retriggerable one-shot and a switch and latch circuit or equivalent timing or other logic circuits, controls the duration of the high light intensity and maintains such high light intensity in response to the first sum signal being equal to or greater than the first predetermined number. When the first sum signal becomes less than the first predetermined number the retriggerable one-shot is allowed to time out. However, when the second sum signal becomes equal to or greater than the second predetermined number the retriggerable one-shot is immediately reset. When the one-shot either times out or is reset, the light source is immediately switched to the low light intensity.

BRIEF DESCRIPTION OF THE DRAWING

The drawing is a partial block diagram of apparatus constructed in accordance with the principles of the present invention.

For the purpose of illustrating the invention, there is shown in the drawing a form which is presently preferred; it being understood, however, that this invention is not limited to the precise arrangements and instrumentalities shown.

DETAILED DESCRIPTION OF THE INVENTION

Referring to the drawing, wherein like numerals indicate like elements, an object 10 bearing indicia such as alpha-numeric characters is illuminated by a light source 12 and transmitting fiber optics 14. The light source 12 is energized by a power source 16 which is operable at any one of a plurality of power levels. The object 10 may be a card, paper tag, label or container bearing indicia printed or embossed thereon. Although, in the drawing, the object 10 is illuminated by a lamp 12 and fiber optics 14, other types of light focusing systems may be used, such as a lens system or other source of collimated light, and the particular focusing system used is not per se part of the present invention.

In the preferred embodiment shown in the drawing, one end of each of the transmitting fiber optics 14 and one end of each of a plurality of receiving fiber optics 18 are located in a read head 15 which is or can be placed in proximity to the object 10 to read the indicia appearing on the object. A typical read head used for this purpose is described in pending application Ser. No. 321,174 entitled Hand Held Optical Reader, which is incorporated herein by reference.

One or more of the receiving fiber optics 18 is connected to one of a plurality of photodetectors, designated in the aggregate as 20. The array of detectors 20 is either located behind the receiving fiber optics 18 in a handle (not shown) containing the read head 15 or in a separate enclosure. The output signals generated by the detectors 20 are fed in parallel to a threshold and multiplex circuit 22 which electronically scans the detectors 20.

A scan clock circuit 28 generates a sequence of digital pulses on line 30. Scan clock circuit 28 may be any of a number of well known digital pulse generating circuits and does not, per se, form part of the present invention. Each pulse generated by scan clock circuit 28 corresponds to one of the detectors 20. The sequence of pulses generated by scan clock circuit 28 on line 30 provides the basic timing for the multiplex part of circuit 22.

Threshold and multiplex circuit 22 scans each of the detectors 20 serially in time in accordance with the sequence of pulses generated by scan clock circuit 28 on line 30. Threshold and multiplex circuit 22 converts parallel-input analog signals from the detectors to serial-output digital signals. It should be understood that scan clock circuit 28 and threshold and multiplex circuit 22 may be part of a character recognition circuit 67, indicated by dashed lines in FIG. 1. A typical character recognition circuit including a scan clock circuit 28 and threshold and multiplex circuit 22 is described in application Ser. No. 321,174, and the description of each of these circuits in that application is incorporated herein by reference.

The threshold part of circuit 22 compares each detector output with a predetermined threshold. When the detector output is equal to or greater than the predetermined threshold a first signal is generated indicating a "light" condition. A light condition will exist when a detector detects sufficient reflectivity from a closely positioned object. When the detector output is less than the predetermined threshold a second signal is generated indicating a "dark" condition. A dark condition will exist when a detector detects insufficient reflectivity. The threshold is generally chosen for the purpose of optimizing character recognition. The threshold and multiplex circuit 22 generates sequences of digital pulses on lines 24 and 26 which indicate whether a light condition or a dark condition was detected by each detector.

In response to the sequence of pulses generated on line 30 by scan clock circuit 28 and the sequence of pulses generated by threshold and multiplex circuit 22 on lines 24 and 26, a gate circuit 27 produces separate sequences of pulses on lines 29 and 33. The sequence of pulses appearing on line 29 identifies those detectors which produced output signals which equal or exceed the predetermined threshold during one complete scan of detectors 20. The sequence of pulses appearing on line 33 identifies those detectors which produced output signals less than the predetermined threshold during the complete scan of detectors 20. When a detector output equals or exceeds the predetermined threshold, it indicates that the light reflected from the object 10 and received by the particular detector emanated from the light source 12 when the detector was sufficiently close to the object 10. On the other hand, when a detector output is less than the predetermined threshold it normally indicates that the detector either merely received direct or reflected ambient light, or that indicia was in juxtaposition with the detector.

As mentioned previously, the sequence of pulses generated by scan clock circuit 28 on line 30 provides the basic timing for the multiplex part of circuit 22 to serially scan detectors 20. In addition, scan clock circuit 28 generates an end of scan signal on line 32 which indicates that the last pulse in the sequence on line 30 has been generated and, therefore, that a new scan of detectors 20 can be commenced. In other words, the end of scan signal denotes the end of one complete scan of all the detectors 20. The function of the end of scan signal is described more fully hereinafter.

A read enable clock circuit 34 receives the scan clock circuit outputs on lines 30 and 32 and the threshold and multiplex circuit outputs on lines 24 and 26. The read enable clock circuit 34 controls a read enable memory 60 which operates the character recognition circuit 67. Read enable clock circuit 34 detects the absence of any second signals indicating a dark condition within one complete scan of the detectors 20 and may be part of the character recognition circuit 67. In particular, read enable clock circuit 34 generates a logical "high" signal on line 36 when threshold and multiplex circuit 22 does not produce a pulse on line 26 during a complete scan of detectors 20. The signal on line 36 enables a NAND gate 38. When NAND gate 38 is enabled, the end of scan signal appearing on line 32 causes a logical "low" signal to appear on line 39. An inverter 41 converts the logical "low" on line 39 to a logical "high" on line 43. Line 43 is connected to the clock input of a read enable counter 58. Read enable counter 58 may be any suitable digital counting circuit known in the art which has separate clock and reset inputs. For example, read enable counter 58 may be a Fairchild 9316 four bit binary counter having separate clock and reset inputs.

The signal appearing on line 43 clocks the read enable counter 58 when both signals on lines 36 and 32 are "high", that is, when no pulses appear on line 26 during a complete scan of detectors 20. Read enable counter 58, therefore, counts the number of consecutive scans of detectors 20 for which no pulses appear on threshold and multiplex circuit output line 26. After a predetermined count has been reached, read enable counter 58 generates a logical signal on line 64 which operates the read enable memory 60. Read enable memory 60 may be a conventional memory device such as a SN74107N J-K flip-flop having its clock input connected to line 64. The logical signal on line 64 causes read enable memory 60 to generate a logical signal on line 66 which activates character recognition circuit 67. Thus, character recognition circuit 67 is turned on by read enable memory 60 only after every detector 20 has produced an output signal which equals or exceeds the predetermined threshold in threshold and multiplex circuit 22 for a predetermined number of scans of detectors 20. This permits the light source 12, which has previously been switched to the high intensity as described hereafter, to achieve a stable operating condition while the read head 15 is properly positioned relative to the object 10 before character recognition circuit 67 is turned on. As a result, false readings due to spurious reflections from the environment or delay as the light source goes from low to high intensity are avoided.

A light counter 40 having separate clock and reset inputs is connected to line 29 at its clock input and to line 32 at its reset input. Light counter 40 counts the number of pulses appearing on line 29 during one complete scan of the detectors 20 and compares that number to a first preselected number. At the end of each scan, the end of scan pulse appearing on line 32 resets counter 40. Light counter 40 may be a four bit binary counter such as a Fairchild 9316 high speed synchronous counter. If the number of pulses appearing on line 29 during a scan equals or exceeds the first preselected number, light counter 40 generates a digital signal on line 42 which operates switch and latch circuit 44. In the preferred embodiment shown, the first preselected number used by light counter 40 is less than one-half of the number of detectors in the array 20, although any preselected number can be used. In general, the preselected number may be varied, as desired, according to the particular requirements of the character recognition system, but must be less than the total number of detectors 20.

As mentioned previously, power source 16 operates at a plurality of power output levels. In the preferred embodiment shown in FIG. 1, power source 16 operates at two power output levels and switch and latch circuit 44 is a SN7473N J-K flip-flop having separate clock and reset inputs. The J terminal of the flip-flop is permanently connected to a high digital signal while the K terminal is permanently connected to a low digital signal. In this configuration, once the flip-flop is set by a clock pulse, further clock pulses have no effect on the flip-flop output. That is, the flip-flop remains set until it is reset by a signal at its reset input. Line 42 is connected to the clock input of the flip-flop. Switch and latch circuit 44, then, is set by the digital signal generated by light counter 40 on line 42. That is, the digital signal on line 42 causes switch and latch circuit 44 to generate a logical high output level on line 45. A high signal on line 45 causes power source 16 to operate at the higher of the two output levels. The reset input of switch and latch circuit 44 is connected to the output 50 of a retriggerable one-shot 48 by means of line 51. The operation of the reset input of switch and latch circuit 44 by one-shot 48 is explained more fully below.

Retriggerable one-shot 48 may be a Fairchild 9602 resettable, retriggerable monostable multivibrator having separate trigger and reset inputs. The trigger input of one-shot 48 is connected by line 46 to the output line 42 of counter 40. Thus, when counter 40 clocks switch and latch circuit 44, it also triggers one-shot 48. In response to the trigger input, one-shot 48 generates a digital signal on lines 50 and 51. The time duration of the signal appearing on line 50 is predetermined by connecting selected external resistive and capacitive elements to the one-shot 48 according to principles well known in the art. These elements are understood to comprise a portion of one-shot 48. The signal generated by one-shot 48 on line 51 disables the reset terminal of switch and latch circuit 44. That is, the one-shot 48 ensures that switch and latch circuit 44 remains in the clocked state, causing power source 16 to operate at the higher power level, until one-shot 48 times out or is reset.

During a single scan of detectors 20, light counter 40 may count up to the first preselected number more than once. Each time light counter 40 reaches the first preselected number it triggers one-shot 48 and clocks switch and latch circuit 44. As mentioned previously, once switch and latch circuit 44 is set, it is not affected by clock pulses on line 42, and it can only be reset by a signal at its reset input. If, however, one-shot 48 has been triggered and it has not timed out or has not been reset, one-shot 48 will disable the reset input of switch and latch circuit 44. During each scan, light counter 40 may repeatedly retrigger one-shot 48 to keep the reset input of switch and latch circuit 44 disabled. Thus, during a scan, counter 40 may repeatedly retrigger one-shot 48, thereby causing switch and latch circuit 44 to operate power source 16 at the higher power level.

The signal generated by one-shot 48 on line 50 also appears on line 82. Line 82 is connected to the reset inputs of read enable memory 60 and read enable counter 58. As mentioned previously, read enable memory 60 may be a conventional J-K flip-flop having separate clock and reset inputs and read enable counter 58 may be a conventional four bit counter having separate clock and reset inputs. When one-shot 48 disables the reset input of switch and latch circuit 44, then, it also disables the reset inputs of read enable memory 60 and read enable counter 58. Consequently, read enable memory 60 is free to activate character recognition circuit 67 in response to read enable counter 58, as previously described. Thus, when light counter 40 generates a signal on lines 42 and 46 to cause switch and latch circuit 44 to maintain power source 16 at the higher power level, one-shot 48 ensures that read enable memory 60 is free to activate character recognition circuit 67 after a predetermined number of scans of detectors 20 during which no signals appear on line 26.

Once power source 16 operates at the higher power level and read enable memory 60 activates character recognition circuit 67, a counter enable circuit 100 enables a dark counter 54 to count the number of digital signals generated by threshold and multiplex circuit 22 on line 26 during the course of a scan of detectors 20. Specifically, counter enable circuit 100 is connected to the output line 66 of read enable memory 60 by means of line 72. Line 72 is connected to an input of a NAND gate 71. Scan clock circuit output line 32 is also connected to counter enable circuit 100 at the input of an inverter 73. Counter enable circuit 100 logically combines the output signal generated by read enable memory 60 on line 66 with the end of scan signal on line 32. When the end of scan signal on line 32 is low, this indicates that a scan of detectors 20 is in progress and has not yet been completed. When the signal on line 72 is high, this indicates that the power source 16 is operating at the higher power level and that read enable memory 60 has activated character recognition circuit 67. Inverter 73 converts the low signal on line 32 to a high signal on line 74. If both signals on lines 72 and 74 are high, NAND gate 71 generates a low signal on line 75. Line 75 is connected to the input of a NAND gate 76. NAND gate 76 inverts the low signal appearing on line 75 to produce a high signal on line 77. Line 77 is connected to the reset input of dark counter 54 and a high signal on line 77 disables that reset input, thereby enabling counter 54 to count. Dark counter 54 may comprise one or more Fairchild 9310 high speed, synchronous BCD decade counters having separate clock and reset inputs, or any other counters known in the art and suitable for the purpose described herein.

If light counter 40 has not yet reached the first preselected number during the course of a scan, counter enable circuit 100 prevents dark counter 54 from counting. More particularly, if light counter 40 has not yet reached the first preselected number, light counter 40 does not trigger one-shot 48. As a result, the output of one-shot 48, on line 50, resets switch and latch circuit 44, read enable counter 58, and read enable memory 60. When switch and latch circuit 44 is kept reset by one-shot 48 it generates a low signal on output line 45, causing power source 16 to operate at the lower power level. At this time, one-shot 48 also keeps read enable memory 60 reset so that the output of memory 60 on line 72 is low. Accordingly, the output of NAND gate 71 is high and the output of NAND gate 76 is low at the reset input of counter 54. Counter 54, then, cannot count until switch and latch circuit 44 operates power source 16 at the higher power level.

In addition, counter enable circuit 100 prevents counter 54 from counting until read enable counter 58 clocks read enable memory 60, causing read enable memory 60 to generate a high signal on line 60 which activates character recognition circuit 67.

Moreover, at the end of each complete scan of the detectors, the end of scan pulse appearing at the input of inverter 73 goes high, causing NAND gate 71 to generate a high output. NAND gate 76, then, generates a low output signal, causing dark counter 54 to reset, at the end of each scan of detectors 20.

Assuming that light counter 40 has reached the first preselected number and triggered one-shot 48, that read enable counter 54 has clocked read enable memory 60 causing read enable memory 60 to activate character recognition circuit 67, and that threshold and multiplex circuit 22 has not completed the latest scan of the detectors 20, counter enable circuit 100 enables dark counter 54. Dark counter 54, then, counts the number of pulses appearing on line 33 and generates a digital signal on line 55 when it reaches a second preselected number. The second preselected number is chosen to normally indicate that the detectors 20 have completely scanned the object 10. The second preselected number reached by dark counter 54 may assume any of a number of values and, in general, it is a function of the maximum number of pulses which are expected to appear on line 26 for a preselected set of indicia on object 10. It is, therefore, entirely independent of the first preselected number reached by light counter 40.

Dark counter 54 is connected, by line 55, to a reset circuit 68. Reset circuit 68 receives the signal on line 55 and, in response, resets retriggerable one-shot 48. Specifically, the signal on line 55 triggers a second one-shot 57 in reset circuit 68. One-shot 57 may be any non-retriggerable monostable multivibrator suitable for the purpose described herein, or it may be a Fairchild 9602 retriggerable monostable multivibrator connected so that its reset input is permanently disabled. The output of one-shot 57, see line 59 of the drawing, is taken off the complementary output terminal so that, when triggered, one-shot 57 generates a low signal of a predetermined time duration on output line 59. Since the reset input of one-shot 57 is permanently disabled, the signal on line 59 remains low and only goes high when one-shot 57 times out.

Line 59 is connected to an input of NAND gate 61. When the signal on line 59 goes low, that is, when one-shot 57 is triggered, NAND gate 61 generates a high signal on line 63, having the same time duration as the signal on line 59. NAND gate 62 inverts the signal appearing on line 63 and generates a low signal on line 70 which is connected to the reset input of one-shot 48. The low signal on line 70, then, resets one-shot 48 before it can time out by itself or be retriggered by light counter 40.

When one-shot 48 is reset by reset circuit 68, it generates low signals on lines 50, 51 and 82. The low signal on line 51 resets switch and latch circuit 44; and the low signal on line 82 resets read enable counter 58 and read enable memory 60. When reset, switch and latch circuit 44 drives power source 16 at the lower power level. Thus, when dark counter 54 reaches the second preselected number, power source 16 switches automatically to the lower power level. At the same time, read enable memory 60 is reset and generates a low signal on lines 66 and 72. The low signal on line 72 causes counter enable circuit 100 to reset dark counter 54. Thus, if one-shot 57 is a retriggerable one-shot such as a Fairchild 9602, counter enable circuit 100 will prevent the one-shot from being retriggered. That is, counter enable circuit 100 will prevent dark counter 54 from counting and retriggering one-shot 57. One-shot 57, then, times out by itself without being retriggered or reset.

At the same time that dark counter 54 is reset, the low signal on line 66 disables the character recognition circuit 67 to prevent false reading. When one-shot 57 times out, reset circuit 68 generates a high signal on line 70, thereby disabling the reset input of one-shot 48. One-shot 48, then, is free to be triggered by light counter 40.

By way of summary, then, when dark counter 54 triggers one-shot 57, power source 16 switches to the lower power output level, and each of the circuits 44, 54, 58, and 60 is reset prior to completion of the scan. After being reset, counters 40 and 54 begin new counting cycles and advance towards their respective preselected numbers, and the aforedescribed operation is repeated.

At the end of a scan of detectors 20, the end of scan signal on line 32 resets threshold and multiplex circuit 22, read enable clock circuit 34, light counter 40 and, through counter enable circuit 100, dark counter 54. If not already reset by dark counter 54, one-shot 48 times out unless retriggered by light counter 40 during the next scan or succeeding scans of detectors 20. If one-shot 48 is retriggered by light counter 40 during the next scan or succeeding scan of detectors 20, before one-shot 48 times out, the reset input of switch and latch circuit 44 remains disabled and switch and latch circuit 44 continues to drive power source 16 at the higher power output level. If, however, light counter 40 does not retrigger one-shot 48 during the next scan or succeeding scans—the precise number of succeeding scans depending on the time duration of the one-shot 48 output pulse—one-shot 48 will time out and reset enable counter 58, read enable memory 60, and switch and latch circuit 44. Power source 16, therefore, will be driven at the lower power output level by switch and latch circuit 44. Thereafter, the power source 16 will not operate at the higher power output level until light counter 40 clocks switch and latch circuit 44 and triggers one-shot 48.

In initially applying power to each of the circuits described above, spurious signals may be generated which cause the circuits to operate improperly during a scan. For example, spurious signals may preset counters 40 and 54 improperly. To immunize the circuits from such signals, input line 80 to NAND gate 61 in reset circuit 68 is momentarily grounded by a Power On switch whenever power is initially applied to the circuits. The Power On switch may be any of a number of conventional momentary closure switches suitable for this purpose. When line 80 is momentarily grounded, NAND gate 61 generates a momentary high signal on line 63, and NAND gate 62 inverts the signal on line 63 to a momentary low signal on line 70. The momentary low signal on line 70 resets retriggerable one-shot 48 which, in turn, resets each of the circuits, as previously described. Thus, the spurious signals are prevented from operating the circuits when power is initially turned on.

Although elements of a particular embodiment of the invention have been described herein, it should be understood that suitable variations and modifications may be made thereto without exceeding the spirit and scope of the invention. For example, although various digital signals have been described as being either high or low, it will be obvious to one of ordinary skill in the art that the inverse signals may be used by modifying certain of the logic elements. In addition, although certain of the elements have been described as J-K flip-flops, other type flip-flops, such as D flip-flops, if appropriately modified, may be used in the present invention. Similarly, it will be obvious to one of ordinary skill in the art to use digital counters having more or less bits than the counters described herein, depending on the number of detectors used and the particular requirements of associated character recognition circuitry.

The present invention may be embodied in other specific forms without departing from the spirit or essential attributes thereof and, accordingly, reference should be made to the appended claims, rather than to the foregoing specification as indicating the scope of the invention.

What I claim and desire to protect by Letters Patent is:

1. A method for controlling the intensity of illumination of a light source in a character recognition system, comprising the steps of:
sensing reflected light with a plurality of detectors;
producing an output signal at the output of each of said detectors in response to said reflected light, said output signal being indicative of the intensity of the reflected light;
generating a first signal when said detector output is equal to or greater than a predetermined threshold;
generating a second signal when said detector output is less than said predetermined threshold;
generating a first sum signal representing the number of said first signals generated;
generating a second sum signal representing the number of said second signals generated;
operating said light source at a first light intensity when said sum signal is equal to or greater than a first preselected sum; and
operating said light source at a second light intensity when said second sum signal is equal to or greater than a second preselected sum.

2. A method according to claim 1 wherein said steps of operating said light source at said first and second light intensities include operating said light source at said first light intensity in response to said first sum signal until said second sum signal exceeds said second preselected sum.

3. A method according to claim 1 including the steps of preventing said first and second sum signals from being generated and preventing said light source from operating at said first light intensity when said light source is initially energized.

4. A method according to claim 2 wherein said step of operating said light source at said first light intensity in response to said first sum signal until said second sum signal exceeds said second preselected sum includes the steps of triggering a retriggerable one-shot in response to said first sum signal; and resetting said retriggerable one-shot when said second sum signal exceeds said second preselected sum.

5. Apparatus for controlling the intensity of a light source in a character recognition system, comprising:
light source means for providing illumination at more than one light intensity;
a plurality of detectors for sensing reflected light, each of said detectors producing an output signal indicative of the intensity of said reflected light;
means for generating a first signal when the output of any of said setectors equals or exceeds a predetermined threshold;
first summing means for generating a first sum signal in response to said first signal generating means, said first sum signal representing the number of first signals generated by said first signal generating means; and
means for controlling said light source means to operate at a first light intensity in response to said first sum signal being equal to or greater than a first preselected number and at a second light intensity in response to said first sum signal being less than said first preselected number.

6. Apparatus according to claim 5 including:
means for generating a second signal when the output of any of said detectors is less than said predetermined threshold;
second summing means for generating a second sum signal in response to said second signal generating means, said second sum signal representing the number of second signals generated by said second signal generating means; and
said controlling means being responsive to said second sum signal being equal to or greater than a second preselected number for operating said light source means at said second light intensity.

7. Apparatus according to claim 6 wherein said first summing means includes a first digital counter and second summing means includes a second digital counter.

8. Apparatus according to claim 6 wherein said controlling means includes a retriggerable one-shot for controlling said light source means in response to said first and second summing means.

9. Apparatus according to claim 6 including a character recognition circuit and means for disabling said character recognition circuit until said first sum signal is equal to or greater than said first preselected number and said second signal generating means generates no second signals for a preselected interval of time.

10. Apparatus according to claim 9 including means for disabling said first and second summing means, said controlling means, and said character recognition circuit disabling means when said light source means is initially energized.

11. Apparatus for controlling the intensity of a light source in a character recognition system, comprising:
light source means for providing illumination at more than one light intensity;
a plurality of detectors for sensing reflected light, each of said detectors producing an output signal indicative of the intensity of said reflected light;
means for generating a first digital signal when the output of any of said detectors is equal to or greater than a predetermined threshold and for generating a second digital signal when the output of any of said detectors is less than said predetermined threshold;
first digital means for counting the number of said first digital signals generated by said generating means;
second digital means for counting the number of said second digital signals generated by said generating means;
first means for controlling said light source means to provide illumination at a first light intensity when said first digital counting means counts equal to or greater than a first preselected number; and
second means for controlling said illuminating means to provide illumination at a second light intensity when said second digital counting means counts equal to or greater than a second preselected number.

12. Apparatus according to claim 11 wherein said first controlling means includes third means for controlling said light source means to provide illumination at said first light intensity in response to said first digital counting means until said second digital counting means counts up to said second preselected number.

13. Apparatus according to claim 12 wherein said third controlling means includes a retriggerable one-shot for controlling said light source means in response to said first digital counting means.

14. Apparatus according to claim 13 wherein said first controlling means includes a flip-flop for controlling said light source means in response to said retriggerable one-shot.

15. Apparatus according to claim 14 wherein said second controlling means includes means for disabling said retriggerable one-shot when said second digital counting means counts up to said second preselected number.

16. Apparatus according to claim 11 including a character recognition circuit and means for disabling said character recognition circuit until said first digital counting means counts up to said first preselected number and said second digital counting means counts no second signals for a preselected number of equal, predetermined time intervals.

17. Apparatus according to claim 16 wherein said disabling means includes third digital means for counting the number of said equal, predetermined time intervals during which said first digital counting means counts up to said first preselected number; and a flip-flop connected to said third digital counting means for disabling said character recognition circuit.

18. Apparatus according to claim 17 including means for disabling said first and second digital counting means, said disabling means and said third controlling means when said illuminating means is initially energized.

* * * * *